United States Patent
Lee et al.

(10) Patent No.: US 8,228,441 B2
(45) Date of Patent: Jul. 24, 2012

(54) APPARATUS AND METHOD FOR RECEIVING DIGITAL MULTIMEDIA BROADCASTING WITHOUT IMAGE DISCONTINUITY DURING CHANNEL SWITCHING

(75) Inventors: Kyung-Eun Lee, Suwon-si (KR); Kyung-Ha Lee, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 138 days.

(21) Appl. No.: 11/185,043

(22) Filed: Jul. 20, 2005

(65) Prior Publication Data

US 2006/0061693 A1    Mar. 23, 2006

(30) Foreign Application Priority Data

Sep. 20, 2004    (KR) .................. 10-2004-0075136

(51) Int. Cl.
*H04N 5/50*      (2006.01)
*H04L 27/06*     (2006.01)

(52) U.S. Cl. ....................... 348/731; 375/340
(58) Field of Classification Search .......... 348/484, 348/500, 553, 554, 555, 570, 598, 706, 731; 375/267, 340
See application file for complete search history.

(56) References Cited

U.S. PATENT DOCUMENTS

| | | | | |
|---|---|---|---|---|
| 3,925,776 A * | 12/1975 | Swallow | ......................... | 345/1.1 |
| 5,287,182 A * | 2/1994 | Haskell et al. | ................ | 348/500 |
| 5,592,235 A * | 1/1997 | Park et al. | ..................... | 348/555 |
| 5,761,210 A * | 6/1998 | Claydon et al. | ............... | 714/701 |
| 5,987,070 A * | 11/1999 | Fimoff et al. | ................. | 375/286 |
| 6,216,250 B1 * | 4/2001 | Williams | ...................... | 714/799 |
| 6,370,666 B1 * | 4/2002 | Lou et al. | ...................... | 714/751 |
| 6,714,264 B1 | 3/2004 | Kempisty | | |
| 6,791,955 B1 * | 9/2004 | Kikuchi et al. | .............. | 370/320 |
| 6,985,188 B1 * | 1/2006 | Hurst, Jr. | ...................... | 348/553 |
| 7,307,671 B2 * | 12/2007 | Garandeau | .................... | 348/731 |
| 7,366,462 B2 * | 4/2008 | Murali et al. | ................ | 455/3.06 |
| 2003/0048808 A1 * | 3/2003 | Stahl et al. | .................... | 370/487 |
| 2003/0097621 A1 * | 5/2003 | Xin | ................ | 714/701 |
| 2004/0034864 A1 * | 2/2004 | Barrett et al. | ................... | 725/38 |
| 2004/0114052 A1 * | 6/2004 | Sin | ................ | 348/570 |
| 2004/0189879 A1 * | 9/2004 | Read | ............................. | 348/731 |
| 2004/0218685 A1 * | 11/2004 | Rainbolt et al. | ............. | 375/267 |
| 2005/0080904 A1 * | 4/2005 | Green | .......................... | 709/227 |
| 2005/0081244 A1 * | 4/2005 | Barrett et al. | ................... | 725/97 |
| 2006/0064727 A1 | 3/2006 | Cho | ................ | 725/68 |

(Continued)

FOREIGN PATENT DOCUMENTS

CN    1298259    6/2001

(Continued)

*Primary Examiner* — Albert Cutler
(74) *Attorney, Agent, or Firm* — The Farrell Law Firm, P.C.

(57) ABSTRACT

An apparatus and a method capable of receiving digital broadcasting without image discontinuity during channel switching. A digital multimedia broadcasting receiver buffers a previous channel while a new channel is buffered in a deinterleaver, thereby preventing image discontinuity during channel switching. The digital broadcasting receiver receives and deinterleaves broadcast data of a channel to be changed and stores the deinterleaved broadcast data in a buffer when a broadcast channel change is requested. The digital broadcasting receiver outputs and displays broadcast data of an initial channel stored in the buffer and stops output of the broadcast data of the initial channel and outputs the broadcast data of the channel to be changed, when the broadcast data of the channel to be changed are stored in the buffer by a predetermined buffering size.

8 Claims, 4 Drawing Sheets

U.S. PATENT DOCUMENTS

| | | | |
|---|---|---|---|
| 2006/0250527 A1 | 11/2006 | Yoon | 348/731 |
| 2006/0262227 A1 | 11/2006 | Jeong | 348/732 |
| 2006/0290808 A1 | 12/2006 | Choi et al. | 348/468 |

FOREIGN PATENT DOCUMENTS

| | | |
|---|---|---|
| CN | 1507277 | 6/2004 |
| JP | 2001-274696 | 10/2001 |
| JP | 2001-292381 | 10/2001 |
| JP | 2001-320345 | 11/2001 |
| JP | 2002-051325 | 2/2002 |
| JP | 2003-023582 | 1/2003 |
| JP | 2003-319275 | 11/2003 |
| KR | 1020020018604 | 3/2002 |
| WO | WO 03/039139 * | 5/2003 |

* cited by examiner

APPARATUS AND METHOD FOR RECEIVING DIGITAL MULTIMEDIA BROADCASTING WITHOUT IMAGE DISCONTINUITY DURING CHANNEL SWITCHING

PRIORITY

This application claims priority to an application entitled "Apparatus And Method For Receiving Digital Multimedia Broadcasting Without Image Discontinuity During Channel Switching" filed in the Korean Intellectual Property Office on Sep. 20, 2004 and assigned Serial No. 2004-75136, the contents of which are incorporated herein by reference.

BACKGROUND OF THE INVENTION

1. Field of the Invention

The present invention relates generally to digital broadcasting, and more particularly to an apparatus and a method capable of receiving digital broadcasting without image discontinuity during channel switching.

2. Description of the Related Art

Digital broadcasting, in particular, digital multimedia broadcasting (DMB) utilizing a system E scheme of an international telecommunication union (ITU) proposes convolutional interleaving/deinterleavirig. According to the convolutional interleaving, a DMB transmitter temporarily stores several input bits, delays the input bits for a predetermined period of time and outputs the delayed input bits when transmitting broadcasting data. Consequently, several bits delayed and output are interleaved between two bits adjacent to each other at the time of input. Accordingly, the DMB transmitter obtains a data stream having a sequence different from an input sequence through an interleaving and transmits the interleaved data stream.

A DMB receiver deinterleaves the interleaved data stream received from the DMB transmitter and restores the data stream to an original input bit sequence. When a continuous burst error has occurred in a portion of the interleaved data stream transmitted from the DMB transmitter, the data stream, having been restored to the original input bit sequence through the deinterleaving process, has a random error changed from the burst error. Accordingly, a viterbi decoder of the DMB receiver can effectively perform an error correction.

When a broadcasting channel is switched, the DMB transmitter fills buffers of a deinterleaver for a changed broadcasting channel (i.e., performs deinterleaving) and then displays the changed broadcasting channel. Accordingly, whenever a broadcasting channel is switched, a period of time is required for the buffer of the deinterleaver to empty and then fill. In the conventional DMB receiver, a period of time from 0.264 seconds at minimum to 6.514 seconds may be required for a deinterleaver buffering.

Additionally, when considering a period of time for which the DMB receiver divides the deinterleaved and error-corrected broadcasting data into audio data and video data and processes the audio data and video data, the DMB receiver does not display anything for more than several seconds. Accordingly, a user's viewing is interrupted with image discontinuity such as blue screen every time prior to watching other broadcasting channels.

SUMMARY OF THE INVENTION

Accordingly, the present invention has been designed to solve the above and other problems occurring in the prior art, and an object of the present invention is to provide an apparatus and a method for receiving a DMB capable of preventing image discontinuity during channel switching.

In accordance with one aspect of the present invention, there is provided a method for changing broadcasting channels in a digital broadcasting receiver. The method includes the steps of: receiving and deinterleaving broadcasting data of a channel to be changed and storing the deinterleaved broadcasting data in a buffer, when a broadcasting channel change is requested; outputting and displaying broadcasting data of an initial channel stored in the buffer; and stopping output of the broadcasting data of the initial channel and outputting the broadcasting data of the channel to be changed, when the broadcasting data of the channel to be changed are stored in the buffer by a predetermined buffering size.

In accordance with another aspect of the present invention, there is provided a digital broadcasting receiver including: a deinterleaver for receiving and deinterleaving broadcasting data of a channel to be changed when a broadcasting channel change is requested; a buffer for storing broadcasting data of an initial channel and outputting the broadcasting data of the initial channel until the broadcasting data of the channel to be changed are stored by a predetermined buffering size; and a display unit for providing a user with the broadcasting data output from the buffer.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described in detail with reference to the accompanying drawings. In the following description of the present invention, a detailed description of known functions and configuration incorporated herein will be omitted when it may make the subject matter of the present invention rather unclear.

Figure 1:
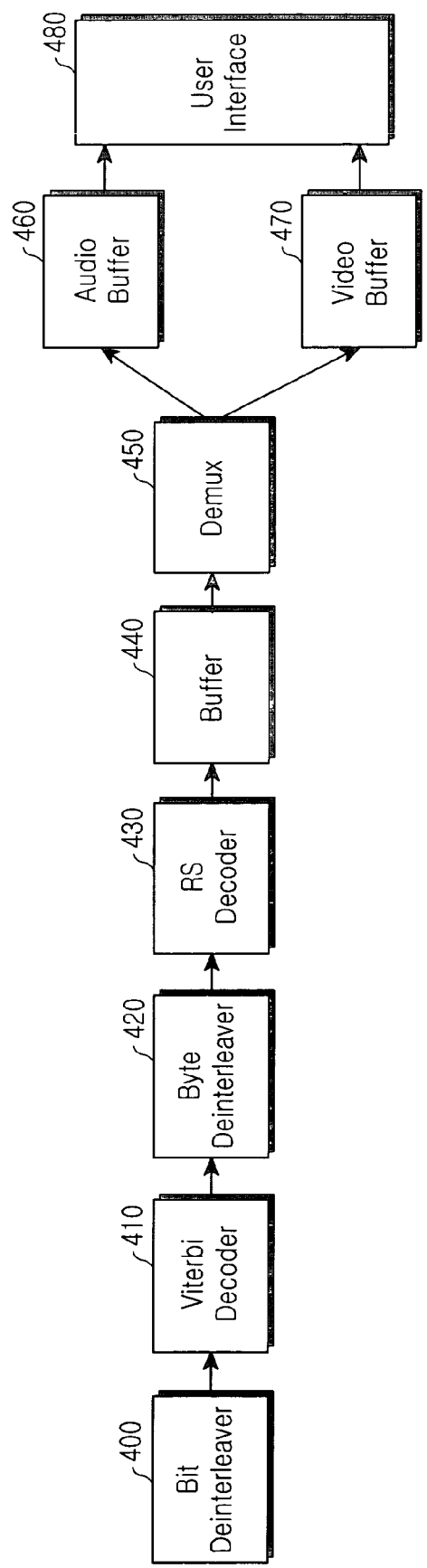
FIG. 1 is a block diagram illustrating a DMB receiver according to an embodiment of the present invention.

FIG. 1 is a block diagram illustrating a DMB receiver according to an embodiment of the present invention. Referring to FIG. 1, the DMB receiver includes a bit deinterleaver 400 for deinterleaving interleaved data by the bit and changing a bit unit of burst error to a random error, a viterbi decoder 410 for error-correcting the deinterleaved data, which are output from the bit deinterleaver 400, by the bit, a byte deinterleaver 420 for deinterleaving the data output from the viterbi decoder 410 by the byte and changing a byte unit of burst error to a random error, an RS decoder 430 for error-correcting the deinterleaved data, which are output from the byte deinterleaver 420, by the byte, and a buffer 440, which is disposed between the RS decoder 430 and a demux 450. An existing memory provided in the DMB receiver may be used as the buffer 440 or a new memory may be provided. The data output from the RS decoder 430 is stored in the buffer 440 before being input to the demux 450, which divides the data output from the buffer 440 into audio data and video data.

An audio buffer 460 stores the audio data output from the demux 450 and a video buffer 470 stores the video data output from the demux 450. A user interface 480 includes a key pad for receiving a key input for a user, a speaker for outputting the audio data output from the audio buffer 460 as a sound signal capable of being recognized by the user, and a display unit for displaying the video data output from the video buffer 470 as an image capable of being recognized by the user.

Figure 2:
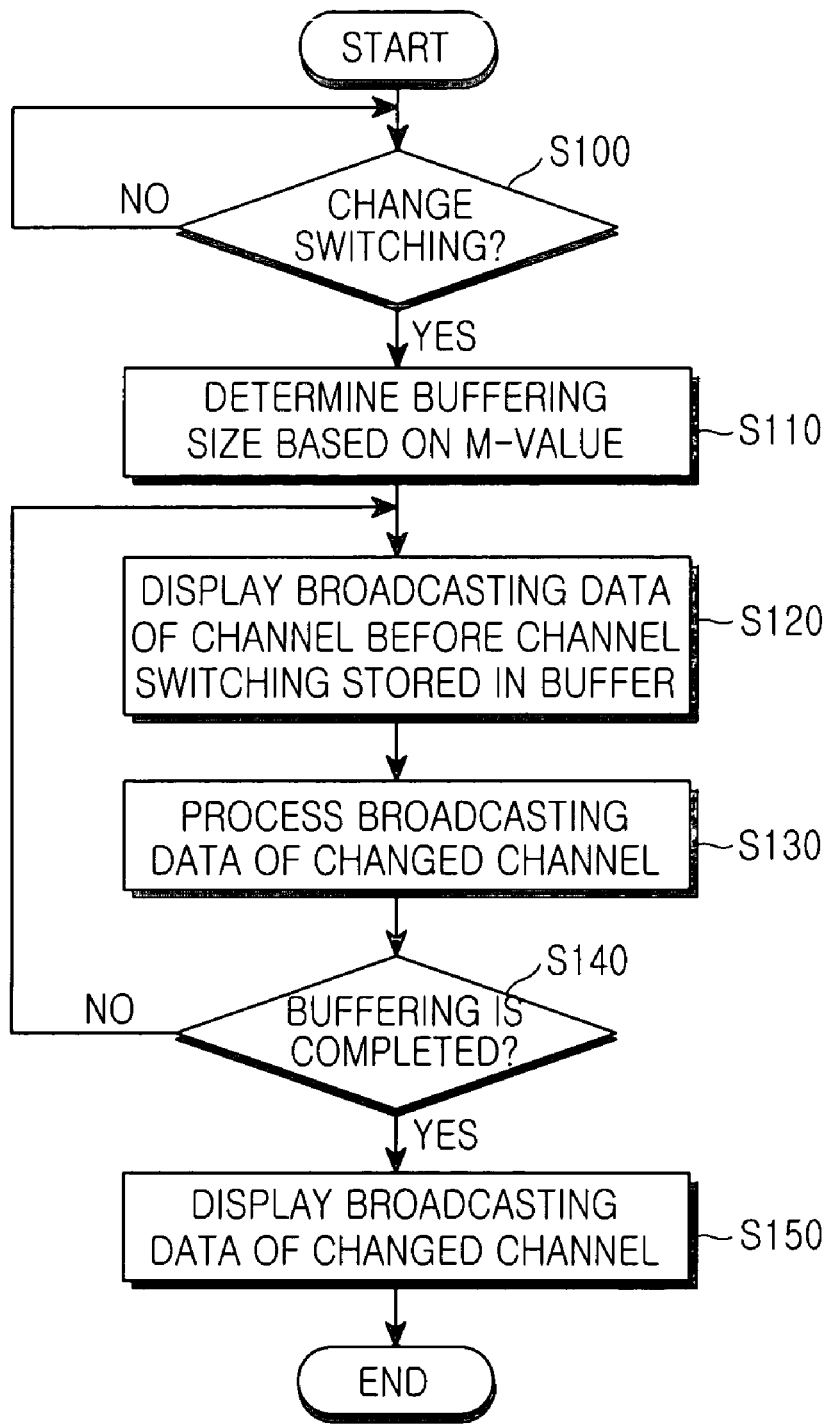
FIG. 2 is a flow diagram illustrating a DMB reception process according to an embodiment of the present invention.

FIG. 2 is a flow diagram illustrating a DMB reception process according to an embodiment of the present invention. Referring to FIG. 2, when a user watching a DMB attempts broadcasting channel switching by means of the key pad of the user interface 480 of FIG. 1 in step S100, the DMB receiver receives interleaved broadcasting data of the changed channel from a DMB transmitter. According to one embodiment of the present invention, it is possible to change the size (i.e., buffering size) of data, which must be stored in the buffer 440 for a display of the broadcasting data of the changed channel. In step S110, the DMB receiver determines a buffering size based on interleaving depth of the broadcasting data.

The interleaving depth used in an interleaving is indicated by an m-value. As the m-value increases, the DMB transmitter performs an interleaving process for broadcasting data to be transmitted more frequently. As a result, the ratio at which a burst error is changed to a random error increases and the viterbi decoder 410 has increased error correction ability. The DMB receiver can recognize the m-value through code division multiplexing (CDM) configuration information of a pilot channel 100, that is, broadcasting channel configuration information.

TABLE 1

| The number of m | Total bit | Required Time | Buffer Size | |
|---|---|---|---|---|
| 53 | 67,575 | 0.264 s | 44.8 packets | 8.5 Kbytes |
| 109 | 138,975 | 0.543 s | 92.2 packets | 17.3 Kbytes |
| 218 | 277,950 | 1.086 s | 184.5 packets | 34.6 Kbytes |
| 436 | 555,900 | 2.171 s | 368.9 packets | 69.3 Kbytes |
| 654 | 833,850 | 3.257 s | 553.4 packets | 104 Kbytes |
| 981 | 1,250,775 | 4.886 s | 830.3 packets | 156 Kbytes |
| 1308 | 1,667,700 | 6.514 s | 1106.9 packets | 208 Kbytes |

Table 1 shows the number of bits used in an interleaving according to the m-value, that is, the number of bits interleaved between adjacent two bits of broadcasting data by an interleaving, and the size of the buffer 440 corresponding to the number of bits. The DMB receiver can dynamically assign a memory according to the m-value.

For example, in order to buffer broadcasting data transmitted through a service of a DMB provider, which selects an m-value 654 and provides the service, it is necessary to provide the buffer 440 having a size of 553.4 packets, that is, 104 Kbytes. Further, in order to deinterleave and error-correct the broadcasting data of the m-value 654 in the DMB receiver, 3.257 seconds are required. That is, 3.257 seconds are required for buffering the broadcasting data of the m-value 654 in the buffer 440.

In step S120, broadcasting data of a channel before the channel switching remaining in the buffer 440 is output to the demux 450. The buffer 440 stores the broadcasting data corresponding to a buffering size determined based on an m-value of a previous channel. The demux 450 divides the input broadcasting data into the audio data and the video data, stores the audio data in the audio buffer 460, and stores the video data in the video buffer 470. The stored audio data and video data are output as a sound signal and an image capable of being recognized by a user through the speaker and the display unit of the user interface 480. Step S120 is continuously performed while the steps S130 and S140 are performed.

In step S130, the DMB receiver deinterleaves and error-corrects the received broadcasting data of the changed channel and stores the broadcasting data in the buffer 440. That is, the broadcasting data of the channel before the channel switching stored in the buffer 440 are output to the demux 450 through step S120.

Simultaneously, the deinterleaved and error-corrected broadcasting data of the changed channel are stored in the empty space of the buffer 440 through step S130.

In step S140, the DMB receiver determines if the broadcasting data of the changed channel corresponding to a buffering size determined based on an m-value has been stored in the buffer 440. When a buffering has been completed, the broadcasting data stored in the buffer 440 is input to the demux 450. That is, in step S150, the demux 450 divides the input broadcasting data into the audio data and the video data, stores the audio data in the audio buffer 460 and stores the video data in the video buffer 470. The stored audio data and video data are output as a sound signal and an image capable of being recognized by the user through the speaker and the display unit of the user interface 480.

According to the present invention, the broadcasting data of the channel before the channel switching stored in the buffer 440 are continuously displayed until the broadcasting data of the changed channel are displayed, such that image discontinuity during the channel switching can be prevented.

Although a case in which the buffering size is changed has been described in the present embodiment, it is noted that it is possible to fix the buffering size. For example, when the buffering size is fixed to a value corresponding to the largest m-value or the m-value can be fixed and S110 can be omitted when the same m-value is used in all broadcasting channels.

Meanwhile, although the user has changed a channel, the user may be confused due to the continuous display of a previous channel. A solution to this problem will be described herein below with reference to FIG. 3.

Figure 3:
FIG. 3 is an exemplary view illustrating a screen displayed during channel switching according to an embodiment of the present invention.

FIG. 3 is an exemplary view illustrating a screen displayed during channel switching according to an embodiment of the present invention. Referring to FIG. 3, while the broadcasting data of the channel before the channel switching remaining in the buffer 440 are displayed, the display unit of the user interface 480 displays a message such as "Channel is being switched." and prevents the user from being confused.

Figure 4:
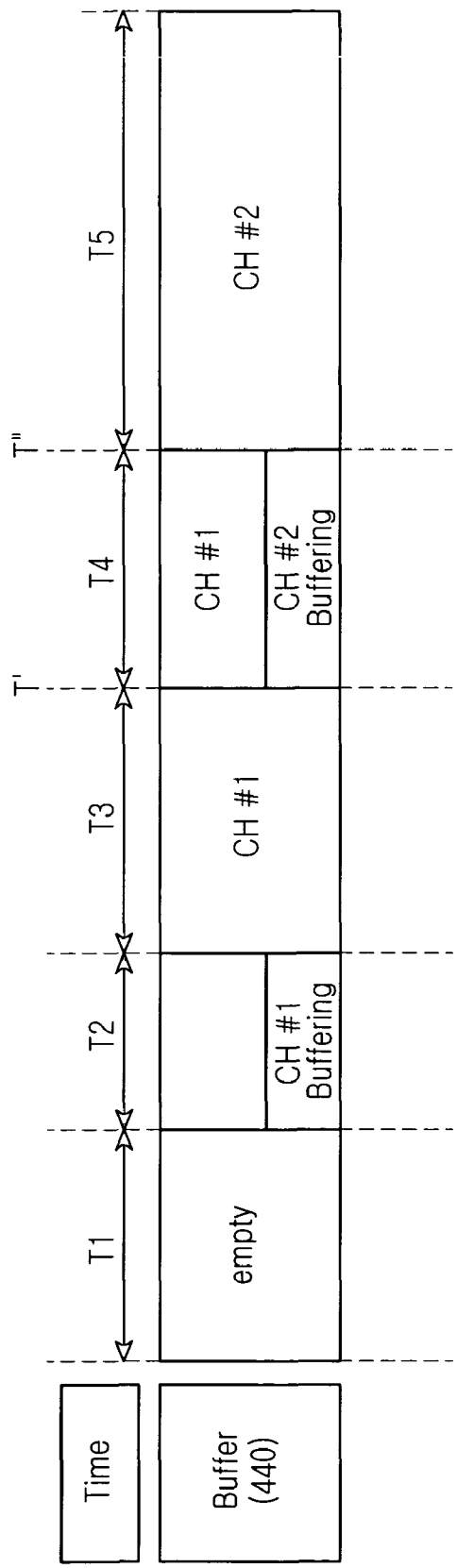
FIG. 4 is a timing chart illustrating a state of buffering based on a DMB reception process according to an embodiment of the present invention.

FIG. 4 is a timing chart illustrating a state of buffering based on a DMB reception process according to an embodiment of the present invention. It is noted that the embodiment of FIG. 4 illustrates using the service of the DMB provider, which selects the m-value 654 and provides the service as an example, and does not consider a time for processing audio/video data except for a delay time according to a deinterleaving and error correction time.

Referring to FIG. 4, when the user attempts to watch a broadcasting by means of the key pad of the user interface 480 of FIG. 1, the DMB receiver receives broadcasting data of an initial set channel ('CH#1') from the DMB transmitter. The broadcasting data of the received CH#1 are deinterleaved and error-corrected by the bit deinterleaver 400, the viterbi decoder 410, the byte deinterleaver 420, and RS decoder 430.

A time required for performing the above process is 3.257 seconds (T1), which is a delay time according to the m-value 654.

The DMB receiver stores the deinterleaved and error-corrected broadcasting data of CH#1 in the buffer 440. That is, the processed CH#1 broadcasting data corresponding to 553.4 packets (i.e., 104 Kbytes) is stored in the buffer 440 according to the m-value 654. After storing the 104 Kbyte broadcasting data of CH#1 in the buffer 440, the DMB receiver deinterleaves and error-corrects 104 Kbyte broadcasting data of CH#1 following the stored data. A time required for performing this process is 3.257 seconds (T2), which is the delay time according to the m-value 654, similarly to T1.

In a T3, the DMB receiver outputs the first 104 Kbyte broadcasting data of CH#1 stored in the buffer 440 to the demux 450 and simultaneously stores the second 104 Kbyte broadcasting data of CH#1 in an empty buffer space of the buffer 440. Further, the broadcasting data of CH#1 output to the demux 450 is output as a sound signal and an image capable of being recognized by the user through the audio buffer 460, the video buffer 470, the speaker, and the display unit of the user interface 480. Therefore, the broadcasting of CH#1 starts (T3).

When the user changes CH#1 to a CH#2 (T'), the DMB receiver receives broadcasting data of CH#2. Further, the DMB receiver deinterleaves and error-corrects the interleaved broadcasting data of CH#2 and outputs the broadcasting data of CH#1 remaining in the buffer 440 to the demux 450, while performing the deinterleaving and error-correction. Accordingly, the 104 Kbyte broadcasting data of CH#1 according to the m-value 654 remains in the buffer 440 and the DMB receiver controls the broadcasting data to be displayed for 3.257 seconds, equal to the delay time according to the m-value 654 of the changed channel. The DMB receiver outputs the broadcasting data of CH#1 remaining in the buffer 440 to the demux 450 and simultaneously stores the deinterleaved and error-corrected broadcasting data of CH#2 in an empty space of the buffer 440. Because the m-value of CH#2 is identical to that of CH#1, a time for which the interleaved broadcasting data is deinterleaved and error-corrected is also 3.257 seconds. Accordingly, the time is identical to a broadcasting time of the remaining broadcasting data of CH#1 (T4).

Herein, the display unit of the user interface 480, which displays the broadcasting data of CH#1 for T4, displays a message such as "Channel is being switched", as illustrated in FIG. 3 and prevents the user from being confused.

When T4 (i.e., 3.257 seconds) passes and all broadcasting data of CH#1 remaining in the buffer 440 are transferred to the user, it becomes the time point T' at which the broadcasting data of CH#2 are continuously transferred to the user without image discontinuity during channel switching. That is, the time point 'T' is a time point at which all broadcasting data of CH#1 remaining in the buffer 440 are output and the 104 Kbyte broadcasting data of CH#2 stored in the buffer 440 are transferred to the user through the demux 450, the audio buffer 460, the video buffer 470, the speaker, and the display unit of the user interface 480. The broadcasting data of CH#2 stored in the buffer 440 are transferred to the user and simultaneously the following broadcasting data of CH#2 stored in an empty space of the buffer 440. Therefore, deinterleaved and error-corrected broadcasting data of CH#2 are continuously stored in the buffer 440 (T5).

Accordingly, the user does not watch a blank screen during the channel switching. Further, the DMB receiver performs the above processes, thereby continuously transferring the changed channel to the user without image discontinuity during the channel switching.

According to the present invention as described above, when a user of a DMB receiver changes a channel, the broadcasting of the changed channel is provided to the user without image discontinuity.

Further, according to the present invention, because a DMB service provider can provide a user with a broadcasting service without image discontinuity, the user does not experience a delay occurring during channel switching.

Furthermore, according to the present invention, because a user can watch the next channel without image discontinuity and a blank screen, the user can accept the same feeling as that in the conventional terrestrial TV receiver. Accordingly, the satisfaction for a DMB service can increase.

Although preferred embodiments of the present invention have been described for illustrative purposes, those skilled in the art will appreciate that various modifications, additions, and substitutions are possible, without departing from the scope and spirit of the invention as disclosed in the accompanying claims, including the full scope of equivalents thereof.

What is claimed is:

1. A method for changing broadcast channels in a digital broadcasting receiver, the method comprising the steps of:
   outputting and displaying broadcast data of an initial channel stored in a buffer;
   when a broadcast channel is changed, receiving and deinterleaving broadcast data of the changed channel and storing the deinterleaved broadcast data in the buffer; and
   stopping output of the broadcast data of the initial channel from the buffer and outputting the broadcast data of the changed channel from the buffer, when an amount of the broadcast data of the changed channel stored in the buffer reaches a buffering size that is dynamically set on a per-channel basis in accordance with an m-value that is recognized through Code Division Multiplexing (CDM) configuration information of a pilot channel of the changed channel, wherein the m-value relates to an interleaving depth of the broadcast data of the changed channel and as the m-value increases, an interleaving process for the broadcast data of the changed channel is performed more frequently;
   wherein the broadcast data of the initial channel before a channel switching stored in the buffer are continuously displayed until the broadcast data of the changed channel is displayed such that image discontinuity during the channel switching is attenuated.

2. The method as claimed in claim 1, wherein a size of the broadcast data of the initial channel stored in the buffer is determined based on an interleaving depth of the broadcast data of the initial channel.

3. The method as claimed in claim 1, wherein a display time of the broadcast data of the initial channel is identical to an output delay time of the broadcast data of the changed channel.

4. The method as claimed in claim 1, further comprising the step of displaying a message representing channel switching to a user while the broadcast data of the initial channel is displayed.

5. A digital broadcasting receiver comprising:
   a deinterleaver for, when a broadcast channel is changed, receiving and deinterleaving broadcast data of the changed channel;

wherein broadcast data of an initial channel before a channel switching stored in a buffer are continuously displayed until the broadcast data of the changed channel is displayed such that image discontinuity during the channel switching is attenuated;

a buffer for storing the broadcast data of the initial channel and outputting the broadcast data of the initial channel until an amount of the broadcast data of the changed channel stored in the buffer reaches a buffering size that is dynamically set on a per-channel basis in accordance with an m-value that is recognized through Code Division Multiplexing (CDM) configuration information of a pilot channel the changed channel, wherein the m-value relates to an interleaving depth of the broadcast data of the changed channel and as the m-value increases, an interleaving process for the broadcast data of the changed channel is performed more frequently; and a display unit for providing a user with the broadcast data output from the buffer.

6. The digital broadcasting receiver as claimed in claim 5, wherein the buffer determines a storage size of the broadcast data of the initial channel based on an interleaving depth of the broadcasting data of the initial channel.

7. The digital broadcasting receiver as claimed in claim 5, wherein the display unit displays a message representing channel switching to the user while the broadcast data of the initial channel is displayed.

8. The digital broadcasting receiver as claimed in claim 5, wherein the display unit comprises:

a demux for dividing the broadcast data from the buffer into audio data and video data;

display buffers for respectively storing the audio data and the video data output from the demux; and a display for providing the user with the data output from the display buffers.

* * * * *